April 29, 1930.  T. E. FORSTER  1,756,246
GRAIN CLEANING PROCESS AND MACHINE
Filed Dec. 22, 1927    3 Sheets-Sheet 2
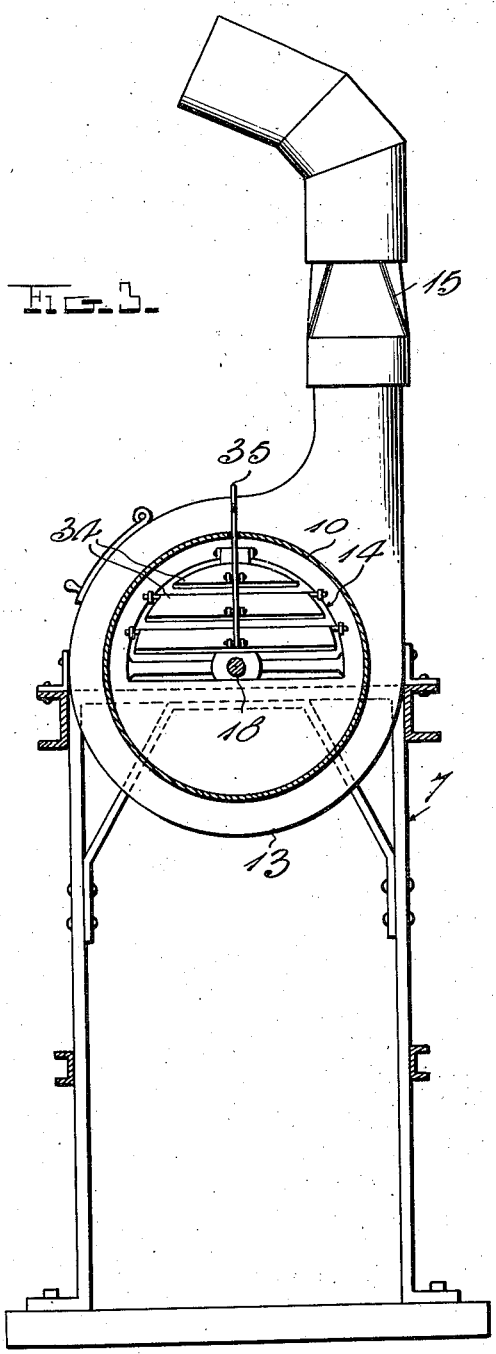
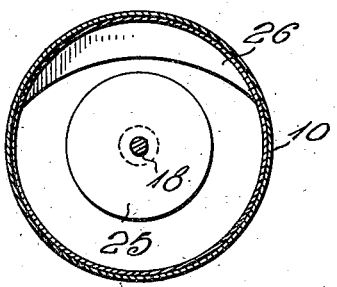
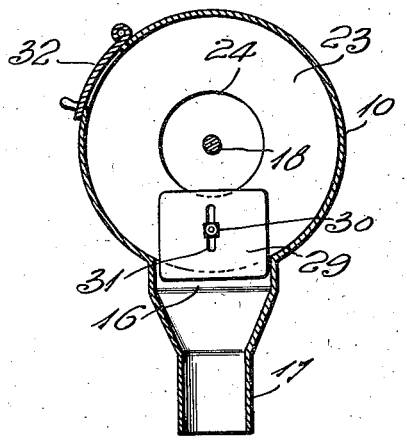
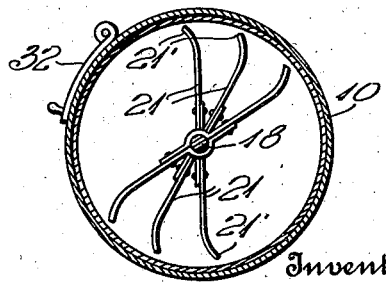
Inventor
Thomas E. Forster

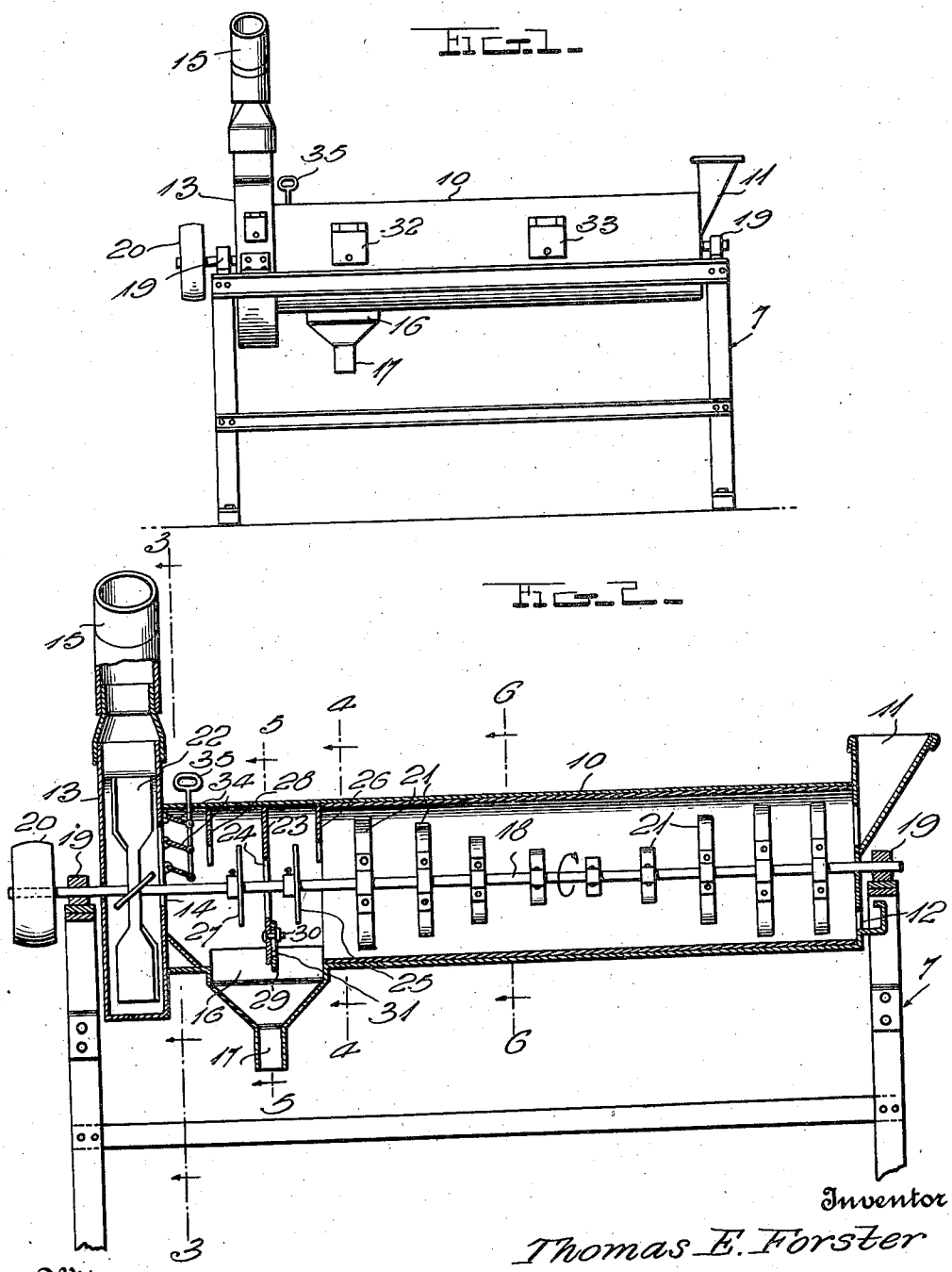

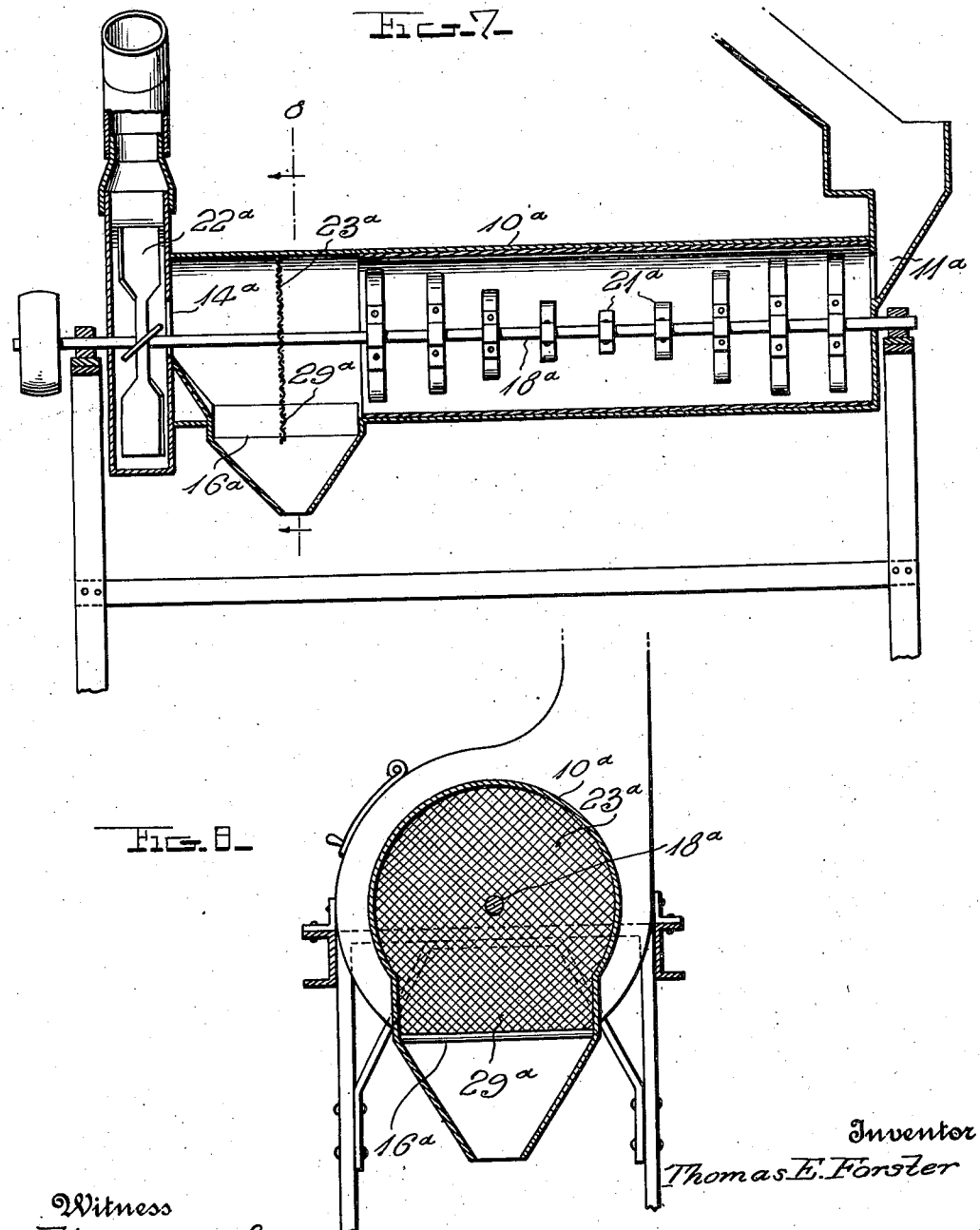

Patented Apr. 29, 1930

1,756,246

UNITED STATES PATENT OFFICE

THOMAS E. FORSTER, OF WICHITA, KANSAS, ASSIGNOR, BY DIRECT AND MESNE ASSIGNMENTS, TO THE FORSTER MANUFACTURING COMPANY, OF WICHITA, KANSAS, A CORPORATION OF KANSAS

GRAIN-CLEANING PROCESS AND MACHINE

Application filed December 22, 1927. Serial No. 241,899.

This application is a continuation in part of my allowed U. S. application Serial No. 139,503 filed October 4, 1926.

The invention relates to the removal of smut, crease dirt, dust and the like, from previously threshed grain, and it is my object to provide a new and improved process and machine for effecting such grain cleaning by the action of an air current of high velocity in which all of the individual grains of the grain being cleaned, are held in suspension during the cleaning operation. In carrying the invention into effect in the most advantageous manner, a high-velocity air current is produced in a cylinder and is cyclonically whirled to compress or densify its peripheral portion, while creating a partial vacuum at its central portion, and the grain to be cleaned is fed into this cylinder in such small quantity, that all of the individual grains will be held in suspension in the air current rather than being scoured against the cylinder wall as is now customary with grain cleaning machines. The comparatively heavy grain travels principally in the densified peripheral portion of the air current, whereas the lighter smut and the like is stripped or sucked from the grain into the partial vacuum at the central portion of said air current and is carried off, leaving the cleaned grain with no trace whatever of smut, crease dirt or other foreign accumulations.

With the foregoing in view, the invention resides in the novel process and machine hereinafter described and claimed, description being accomplished by reference to the accompanying drawings.

Fig. 1 is a side elevation showing one form of machine constructed in accordance with my invention.

Fig. 2 is a central vertical longitudinal sectional view through the machine shown in Fig. 1.

Figs. 3, 4, 5 and 6 are vertical transverse sections on the correspondingly numbered lines of Fig. 2.

Fig. 7 is a central longitudinal sectional view through a somewhat different machine.

Fig. 8 is a transverse section on line 8—8 of Fig. 7.

In the form of construction shown in Figs. 1 to 6 inclusive, 9 designates an appropriate supporting frame upon which a horizontally elongated drum or cylinder 10 is fixedly mounted, said drum or cylinder having a grain inlet 11 and an air inlet 12 at one end and being provided with a fan housing 13 at its other end. The interior of the drum or cylinder 10 communicates with the housing 13 by means of an air outlet opening 14, and said housing is provided with a discharge pipe 15 which may lead to any desired point. The grain outlet 16 for the drum or cylinder 10 is in the bottom of the same, near the housing 13 and preferably terminates in a spout 17 which may be used for guiding the cleaned grain into sacks, baskets or other containers.

A high speed shaft 18 passes longitudinally through the cylinder 10 and is disposed at the axis of the latter, said shaft being mounted in appropriate bearings 19 carried by the frame structure 9. This shaft is driven at high speed by any desired means and for illustrative purposes I have shown a pulley 20 on one of its ends. Secured upon this shaft are a plurality of substantially radial arms 21 which cyclonically whirl the current of air passing through the cylinder 10 from the inlet 12 to the outlet 14. Preferably, the outer ends of the arms 21 curve rearwardly somewhat as at 21', assisting materially in densifying the whirling current of air at the peripheral portion of said current and producing a partial vacuum at the central portion of said current. The dividing of the air current however into these densified and partial vacuum zones, is not absolutely dependent upon the curved ends 21' of the arms 21, as sufficiently forcible whirling of the air in the cylinder, will produce these zones, even if the arms or their equivalents be straight from end to end. All of the arms are preferably helically arranged upon the shaft 18 as will be clear from Figs. 2 and 6, thereby not only balancing said shaft, but permitting the arms to act more effectively than if they were disposed in a common plane extending longitudinally of the shaft.

In addition to carrying the arms 21, the shaft 18 carries a suction fan 22 disposed in the housing 13. This fan, upon rapid rotation of the shaft 18, produces an air current of high velocity from the air inlet 12 to the air outlet 14, and as above explained, this current of air is cyclonically whirled in the cylinder 10 by the arms 21, producing a densified zone at the periphery of the air current and a partial vacuum at the central portion thereof. The grain to be cleaned is fed into the cylinder 10 in such small quantities that all of the individual grains will be picked up by the air current, violently whirled thereby and carried in suspension to the outlet 16, suitable provision being made to prevent this grain from traveling on to the air outlet 14. The comparatively heavy grain, in being violently whirled circumferentially of the cylinder 10, naturally travels principally as far from the axis of the cylinder as possible and is hence held in suspension by the comparatively dense peripheral portion of the air current. The smut, crease dirt or the like however, being comparatively light, has less tendency to fly by centrifugal force and is literally stripped or sucked from the individual grains, into the partial vacuum at the central portion of the air current, eventually reaching the outlet 14 and discharging through the pipe or the like 15.

23 designates a grain checking baffle plate or partition which is disposed transversely across the cylinder 10 and spans the grain outlet 16. This baffle is formed with a central opening 24 through which the shaft 18 passes, and this opening is guarded by a baffle disk 25 secured to the shaft 18 and spaced from said baffle 23, toward the inlet end of the cylinder. Another stationary baffle 26 is disposed near the disk 25 and between it and the arms 21. The air outlet opening 14 is guarded by a baffle disk 27 on the shaft 18, between the baffle 23 and the housing 11, and a third stationary baffle 28 which extends across the upper portion of the drum between said housing and said disk 27.

By the arrangement of baffles above described, the air and the dust, smut and the like held in suspension thereby, may pass around said baffles and escape through the outlet 14. The cleaned grain however, is checked by the baffle 23 and caused to discharge through the outlet 16. Any weed seed, garlic for instance, is so light that even if it tends to discharge with the cleaned grain, it will be picked up by the air current and carried on to the air outlet 14.

Preferably, the baffle 23 is provided with a vertically adjustable lower section 29 which may be connected to the major portion of said baffle by any desired means, such as the bolt 30 and slot 31. This section 29 may be projected downwardly into the outlet 16 to any desired extent, according to the character of the grain being cleaned, and it overcomes any tendency of the grain to follow the air under this baffle. To give access to the adjustable mounting means of the baffle section 29, the cylinder 10 may be provided with a door 32. A similar door 33 may be provided in the cylinder at another point to gain access to the interior of said cylinder for any desired purpose, such as tightening the arms 21 should any of them work loose.

The velocity of the air current through the cylinder 10, may be varied to some degree if desired, by the use of any desired means such as louvres 34 extending across the opening 14 and provided with a suitable operating device 35.

In Figs. 7 and 8, the cylinder $10^a$ is provided with a combined grain and air inlet $11^a$ at one end and instead of providing the baffles hereinbefore described for guarding the outlet $14^a$ for the air, smut, dust and the like, I provide an openwork baffle $23^a$ across said cylinder, with its lower portion $29^a$ projecting downwardly into the cleaned grain outlet $16^a$. The high speed shaft $18^a$ passes through the baffle $23^a$ and is provided with arms $21^a$ and fan $22^a$ having the same functions as the corresponding parts previously described.

The machine (either form) is driven at high speed with only a small quantity of wheat in the cylinder, the speed being so great that if a large quantity of wheat were introduced into the cylinder and acted upon by the arms, it would be reduced practically to Graham flour. In a cylinder fifteen inches in diameter and five feet long, the drive shaft rotates at about 1200 revolutions per minute, and the machine then effectively handles 120 bushels of grain per hour, but at no time, is there much more than three pints of grain in the cylinder. This grain is picked up as soon as it enters the cylinder, by the high velocity current of air between the air inlet and the air outlet means, and as above stated, this current of air is cyclonically whirled, densifying its peripheral portion and creating a partial vacuum at its central portion. The grain travels principally in the dense peripheral portion of the air current, as it is being violently whirled circumferentially of the cylinder and hence flies outwardly by centrifugal force, due to its weight. The smut, crease dirt, dust and the like however, have no tendency to fly out by centrifugal force and they are effectively stripped or sucked from the individual grains by the aforesaid partial vacuum at the central portion of the air current. All of this foreign matter thus entrained in the central portion of the air current, travels either through or around the baffle means as the case may be, being eventually discharged, whereas the cleaned grain is prevented from discharging with the air and descends through the grain outlet.

In carrying out my process, I take advantage of the natural characteristics of a cyclone and so utilize them that the grain may not only be more rapidly cleaned than with prior cleaners in which the grain is actually scoured, but also effect a more thorough cleaning operation.

Excellent results may be obtained from the disclosure herein made, but it is to be understood that within the scope of the invention as claimed, numerous changes might be resorted to with good results.

I claim:—

1. A process of cleaning smut and the like from grain comprising the steps of producing a high-velocity air current in a cylinder having a smooth imperforate inner surface and violently whirling said current circumferentially of the cylinder, feeding grain into said cylinder, and relatively controlling the air current and the grain feeding to cause all of the individual grains to be violently whirled and carried in suspension by said current.

2. A process of cleaning smut and the like from grain comprising the steps of producing a high-velocity air current in a cylinder having a smooth imperforate inner surface and cyclonically whirling said current with sufficient velocity to materially densify its peripheral portion and produce a partial vacuum at its central portion, feeding grain into the cylinder, and relatively controlling the air current and the grain feeding to cause all of the individual grains to be violently whirled and carried in suspension by said air current, whereby the grains centrifugally seek and travel principally in the dense peripheral portion of the air current and the smut and the like seek the partial vacuum at the central portion of said current and consequently become stripped from the grains.

3. A cleaner for removing smut and the like from grain, comprising a cylinder having a smooth imperforate inner surface, said cylinder being provided with grain and air inlet means at one end and with grain and air outlet means at its other end, means for preventing the escape of grain through the air outlet means, and means for producing an air current from the air inlet means to the air outlet means of sufficient strength to carry the grain in suspension from the grain inlet means to the grain outlet means and for whirling said current circumferentially of the cylinder.

4. A cleaner for removing smut and the like from grain, comprising a cylinder having a smooth imperforate inner surface, said cylinder being provided with grain and air inlet means at one end and with grain and air outlet means at its other end, means for preventing the escape of grain through the air outlet means, and means for producing an air current from the air inlet means to the air outlet means of sufficient strength to carry the grain in suspension from the grain inlet means to the grain outlet means and for whirling said air current cyclonically with sufficiently high velocity to densify its peripheral portion and form a partial vacuum at its central portion, causing the comparatively heavy grain to travel principally in said dense peripheral portion of said current and causing the relatively light smut and the like to be sucked from the grain into said partial vacuum.

5. A cleaner for removing smut and the like from grain, comprising a cylinder having a smooth imperforate inner surface, said cylinder being provided with grain and air inlet means at one end and with grain and air outlet means at its other end, means for preventing the escape of grain through the air outlet means, and means for producing an air current from the air inlet means to the air outlet means of sufficient strength to carry the grain in suspension from the grain inlet means to the grain outlet means, a high speed shaft extending along the center of said cylinder, and means on said shaft for cyclonically whirling said air current with sufficiently high velocity to densify its peripheral portion and produce a partial vacuum at its central portion, causing the comparatively heavy grain to travel principally in said dense peripheral portion of said current and causing the relatively light smut and the like to be sucked from the grain into said partial vacuum.

6. A cleaner for removing smut and the like from grain, comprising a cylinder having a smooth imperforate inner surface, said cylinder being provided with grain and air inlet means at one end and with grain and air outlet means at its other end, means for preventing the escape of grain through the air outlet means, and means for producing an air current from the air inlet means to the air outlet means of sufficient strength to carry the grain in suspension from the grain inlet means to the grain outlet means, a high speed shaft extending along the center of said cylinder, and substantially radial arms on said shaft for cyclonically whirling said air current with sufficiently high velocity to densify the peripheral portion and produce a partial vacuum at its central portion, causing the comparatively heavy grain to travel principally in said dense peripheral portion of said current and causing the relatively light smut and the like to be sucked from the grain into said partial vacuum.

7. In a grain cleaning machine, a drum having grain and air inlet means at one end, an air outlet at its other end, and a grain outlet, the latter being disposed in the bottom of the drum at said other end, means for creating a current of air through said drum from the air inlet to the air outlet, and a grain checking baffle extending transversely across said drum and spanning the grain outlet to direct the grain into said outlet while permitting air to duck under the baffle and pass into the air outlet.

8. A structure as specified in claim 7; said baffle having a vertically adjustable section projecting downwardly into said grain outlet.

9. A structure as specified in claim 7; together with a driven shaft passing longitudinally through the drum and through an opening in said grain checking baffle and provided with radiating arms, baffle disks on the shaft spaced from opposite sides of said grain checking baffle, and additional transverse baffles extending across the upper portion of the drum and spaced from the sides of said disks remote from said grain checking baffle.

10. In a grain cleaner, a substantially horizontal passage through which the grain and a blast of air are conducted, the lower side of said passage having a grain outlet, and a grain checking baffle extending transversely across said passage and spanning said grain outlet, whereby the baffle will direct grain into the outlet and will permit the air to duck under said baffle and pass on, said baffle having a vertically adjustable section projecting downwardly into said grain outlet.

In testimony whereof, I have affixed my signature.

THOMAS E. FORSTER.